US012730599B2

(12) United States Patent
Li et al.

(10) Patent No.: US 12,730,599 B2
(45) Date of Patent: Sep. 8, 2026

(54) CONTENT DISPLAY METHOD, READABLE MEDIUM, AND ELECTRONIC DEVICE

(71) Applicant: Beijing Youzhuju Network Technology Co., Ltd., Beijing (CN)

(72) Inventors: Chenglong Li, Beijing (CN); Shuai Zeng, Beijing (CN); Xiaowei Li, Beijing (CN); Yang Yu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/044,334

(22) Filed: Feb. 3, 2025

(65) Prior Publication Data

US 2025/0251889 A1 Aug. 7, 2025

(30) Foreign Application Priority Data

Feb. 5, 2024 (CN) ........................ 202410168167.2

(51) Int. Cl.
*G06F 3/14* (2006.01)

(52) U.S. Cl.
CPC ...................................... *G06F 3/14* (2013.01)

(58) Field of Classification Search
CPC .. G06F 3/0482; G06F 3/0481; G06F 3/04817; G06F 3/0483; G06F 3/14; G06F 3/0487; G06F 3/0416; G06F 2203/04803; G06F 9/451; G06F 40/186; G06F 16/248; G06F 16/958; G06F 8/38; G06F 8/34; G09G 5/14; G09G 2354/00; G09G 2340/12; G09G 3/20
See application file for complete search history.

(56) References Cited

U.S. PATENT DOCUMENTS

2014/0331174 A1* 11/2014 Wen .................... G06F 3/04883 715/804
2019/0324825 A1* 10/2019 Schwartz ............ G06F 3/04842
2023/0359279 A1* 11/2023 Liu ......................... G06F 3/016
2023/0359351 A1* 11/2023 Liu ....................... G06F 1/1641
2025/0324129 A1* 10/2025 Jia ...................... H04N 21/4858

FOREIGN PATENT DOCUMENTS

CN 111930459 A 11/2020
CN 117376611 A 1/2024

* cited by examiner

*Primary Examiner* — Dong Hui Liang
(74) *Attorney, Agent, or Firm* — Astute IP Law Group

(57) ABSTRACT

A content display method, a readable medium, and an electronic device are provided. The content display method includes: displaying a content display interface, where the content display interface displays first content; determining a target display style of second content associated with the first content, where the target display style of the second content is determined at least based on attribute information of historical displayed second content; and displaying the second content according to the target display style.

14 Claims, 4 Drawing Sheets

First content

Second content

CONTENT DISPLAY METHOD, READABLE MEDIUM, AND ELECTRONIC DEVICE

CROSS-REFERENCE TO RELATED APPLICATION

The present disclosure claims priority of the Chinese Patent Application No. 202410168167.2 filed on Feb. 5, 2024, the disclosure of which is incorporated herein by reference in its entirety as part of the present application.

TECHNICAL FIELD

The present disclosure relates to a content display method, a readable medium, and an electronic device.

BACKGROUND

With the development of communication technologies and multimedia technologies, the Internet has become a main transmission means of multimedia content such as texts, images, and videos, and users can browse the multimedia content through an application program.

In the related art, other content can be inserted into the multimedia content to transmit other information, for example, the patch content is directly inserted into the video content, and the patch content can be a patch video for introducing a product, which has a single display form and easily affects the user's browsing experience.

SUMMARY

This Summary is provided to introduce concepts in a brief form that are described in detail in the following Detailed Description section. This Summary section is not intended to identify key features or essential features of the claimed technical solution, nor is it intended to be used to limit the scope of the claimed technical solution.

The present disclosure provides a content display method, the content display method includes:

- displaying a content display interface, where the content display interface displays first content;
- determining a target display style of second content associated with the first content, where the target display style of the second content is determined at least based on attribute information of historical displayed second content; and
- displaying the second content according to the target display style.

The present disclosure provides a content display apparatus, the content display apparatus includes:

- a first display module, configured to display a content display interface, where the content display interface displays first content;
- a determination module, configured to determine a target display style of second content associated with the first content, where the target display style of the second content is determined at least based on attribute information of historical displayed second content; and
- a second display module, configured to display the second content according to the target display style.

The present disclosure provides a computer-readable medium, storing a computer program thereon, when the program is executed by a processing apparatus, the steps of the method according to any one of the above are implemented.

The present disclosure provides an electronic device, including:

- a storage apparatus, storing a computer program thereon;
- a processing apparatus, configured to execute the computer program in the storage apparatus, to implement the steps of the method according to any one of the above.

BRIEF DESCRIPTION OF DRAWINGS

The above and other features, advantages, and aspects of various embodiments of the present disclosure will become more apparent when taken in conjunction with the drawings and with reference to the following detailed description. Throughout the drawings, the same or similar reference numbers refer to the same or similar elements. It should be understood that the drawings are schematic and that the components and elements are not necessarily drawn to scale. In the drawings.

DETAILED DESCRIPTION

Figure 1:
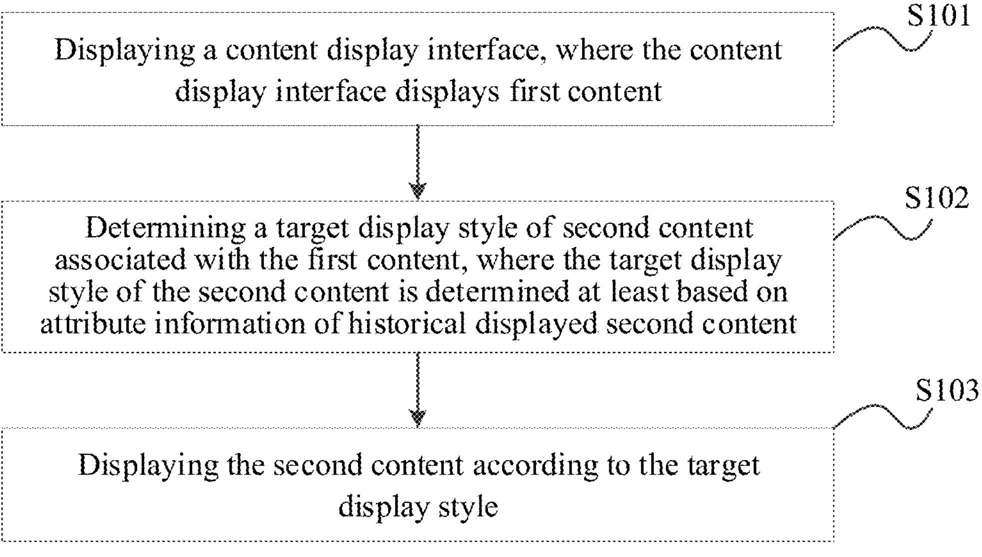
FIG. 1 is a flowchart of a content display method according to an exemplary embodiment of the present disclosure.

Embodiments of the present disclosure will be described in more detail below with reference to the drawings. Although some embodiments of the present disclosure are shown in the drawings, it should be understood that the present disclosure may be implemented in various forms and should not be construed as being limited to the embodiments set forth herein. On the contrary, these embodiments are provided for a more thorough and complete understanding of the present disclosure. It should be understood that the drawings and embodiments of the present disclosure are only for exemplary purposes, and are not intended to limit the scope of protection of the present disclosure.

It should be understood that the various steps described in the method implementations of the present disclosure may be performed in different orders, and/or performed in parallel. In addition, the method implementations may include additional steps and/or omit performing the illustrated steps. The scope of the present disclosure is not limited in this respect.

The term "include" and its variations used herein are open-ended inclusions, that is, "including but not limited to". The term "based on" is "at least partially based on". The term "one embodiment" means "at least one embodiment"; the term "another embodiment" means "at least one additional embodiment"; the term "some embodiments" means "at least some embodiments". Relevant definitions of other terms will be given in the following description.

It should be noted that concepts such as "first" and "second" mentioned in the present disclosure are only used to distinguish different apparatuses, modules or units, and are not used to limit the order or interdependence of functions performed by these apparatuses, modules or units.

It should be noted that the modifications of "one" and "a plurality of" mentioned in the present disclosure are illustrative rather than restrictive, and those skilled in the art should understand that unless the context clearly indicates otherwise, they should be understood as "one or more".

The names of messages or information exchanged between multiple apparatuses in the implementations of the present disclosure are only used for illustrative purposes, and are not used to limit the scope of these messages or information.

It can be understood that, before using the technical solutions disclosed in the embodiments of the present disclosure, the user should be informed of the type, range of use, use scenarios, etc. of personal information involved in the present disclosure and the user's authorization should be obtained in an appropriate manner in accordance with relevant laws and regulations.

For example, in response to receiving an active request from the user, prompt information is sent to the user, so as to clearly prompt the user that the operation requested to be performed will require the acquisition and use of the user's personal information. Therefore, the user can independently choose whether to provide personal information to software or hardware such as an electronic device, an application, a server, or a storage medium that performs the operations of the technical solution of the present disclosure, according to the prompt information.

As an optional but non-limiting implementation, a manner of sending prompt information to the user in response to receiving the user's active request may be, for example, a pop-up window, and the prompt information may be presented in text in the pop-up window. In addition, the pop-up window may also carry a selection control for the user to select "agree" or "disagree" to provide personal information to the electronic device.

It can be understood that, the above process of notifying and acquiring the user's authorization is only illustrative, and does not constitute a limitation to the implementations of the present disclosure, and other manners that satisfy relevant laws and regulations may also be applied to the implementations of the present disclosure.

Meanwhile, it can be understood that, the data involved in the technical solution (including but not limited to the data itself, the acquisition or use of the data) should comply with the requirements of corresponding laws, regulations and related provisions.

Taking inserting a patch video for introducing a product into the video content as an example, usually, a patch video is inserted before the video starts playing, during the video playing, and after the video playing, and when playing the patch video, the original playing video needs to be stopped. The display form is single, the video is easily interrupted, and the user's browsing experience is easily affected.

In view of this, the present disclosure provides a content display method and apparatus, a readable medium, and an electronic device, so as to solve the above technical problem.

The embodiments of the present disclosure are further explained and illustrated hereinafter with reference to the drawings.

FIG. 1 is a flowchart of a content display method according to an exemplary embodiment of the present disclosure. Referring to FIG. 1, the content display method includes:

S101: displaying a content display interface, where the content display interface displays first content;

S102: determining a target display style of second content associated with the first content, where the target display style of the second content is determined at least based on attribute information of historical displayed second content; and

S103: displaying the second content according to the target display style.

By adopting the above method, the content display interface displays the first content, the target display style of the second content associated with the first content is determined at least based on the attribute information of the historical displayed second content, and then the second content is displayed according to the determined target display style. By adopting this method, the display style of the second content is determined based on the attribute information of the historical displayed second content, and the second content of different display styles can be displayed, thereby enriching the display styles of the second content, and further improving the user's browsing experience.

It should be noted that, taking the first content as the video content as an example, the content display interface may be an information stream video display interface, a video player interface, a video detail interface, etc., and the second content may be displayed on the content display interface, for example, the first content and the second content are displayed on the information video display interface, or when the first content is displayed on the information video display interface, the second content is displayed on the video detail interface of the first content after jumping to the video detail interface of the first content in response to a trigger operation on the first content, etc., which is not limited in the present disclosure.

In a possible manner, the target display style of the second content may be determined by: determining a target attribute value according to the attribute information of the historical displayed second content; and determining the target display style of the second content associated with the first content according to a numerical relationship between the target attribute value and a preset threshold.

Exemplarily, the target attribute value may be determined based on the attribute information of the historical displayed second content, so that the target display style of the second content can be determined according to the numerical relationship between the target attribute value and the preset threshold. The target display style of the second content is determined by the numerical attribute value, which can improve the accuracy of determining the display style.

It should be understood that, the first content may be displayed by a client, and then the target display style of the second content is determined and the second content is displayed according to the historical displayed second content. Alternatively, the first content may be displayed by the client, and then the target display style of the second content is determined by a server according to the historical displayed second content, and the second content and the target display style are sent to the client, and then the client displays the second content according to the target display style. It may be specifically set according to requirements, which is not limited in the present disclosure.

In a possible manner, determining the target attribute value according to the attribute information of the historical displayed second content may include: determining a first attribute value according to first attribute information of the historical displayed second content; determining a second attribute value according to second attribute information of the historical displayed second content, where the information included in the first attribute information is more than the information comprised in the second attribute information; and determining the target attribute value according to the first attribute value and the second attribute value.

Exemplarily, the first attribute value may be used to represent the user's acceptance to the historical displayed second content, and the second attribute value may be used to represent the user's interest in the historical displayed second content, which may be specifically set according to requirements, and which is not limited in the present disclosure. Thus, the target attribute value may be determined in combination with the user's acceptance and interest in the historical displayed second content, and the target display style of the second content may be determined according to the target attribute value. Therefore, the second content of different display styles may be displayed to different users, thereby improving the user's browsing experience.

In a possible implementation, determining the first attribute value according to the first attribute information of the historical displayed second content may include: determining the first attribute value according to at least one of a clicked attribute, a browsed attribute, a conversion attribute, an exited attribute, and a display feedback attribute of the historical displayed second content.

Exemplarily, the first attribute information may be at least one of the clicked attribute, the browsed attribute, the conversion attribute, the exited attribute, and the display feedback attribute of the historical displayed second content, which may be specifically determined according to requirements, and which is not limited in the present disclosure. Thus, the first attribute value may be determined from different dimensions, thereby improving the accuracy of determining the display style.

Exemplarily, each piece of the first attribute information may be quantified, and then the first attribute value is determined, for example, the first attribute value is determined by at least one of a value of the clicked attribute, a value of the browsed attribute, a value of the conversion attribute, a value of the exited attribute, and a value of the display feedback attribute, so as to improve the accuracy of determining the display style.

Exemplarily, the attribute values corresponding to one or more pieces of the first attribute information may be added to obtain the first attribute value. Alternatively, in the case that the first attribute value is determined according to multiple pieces of the first attribute information, different weights are allocated to the multiple pieces of the first attribute information, for example, the clicked attribute corresponds to a weight 1, the browsed attribute corresponds to a weight 2, the conversion attribute corresponds to a weight 3, the exited attribute corresponds to a weight 4, and the display feedback attribute corresponds to a weight 5. Then, the attribute values of the multiple pieces of the first attribute information are multiplied by the corresponding weights and then accumulated to obtain the first attribute value. For example, the first attribute value=the value of the clicked attribute×the weight 1+the value of the browsed attribute×the weight 2+the value of the conversion attribute× the weight 3+the value of the exited attribute×the weight 4+the value of the display feedback attribute×the weight 5, etc., which is not limited in the present disclosure. The accuracy of determining the display style is further improved by the weight allocation.

In a possible implementation, determining the second attribute value according to the second attribute information of the historical displayed second content may include: determining the second attribute value according to at least one of a clicked attribute, a browsed attribute, and a display feedback attribute of the historical displayed second content.

Exemplarily, the first attribute information may be at least one of: the clicked attribute, the browsed attribute, and the display feedback attribute of the historical displayed second content, which may be specifically determined according to requirements, and which is not limited in the present disclosure. Thus, the second attribute value may be determined from different dimensions, thereby improving the accuracy of determining the display style.

Exemplarily, each piece of the second attribute information may be quantified, and then the second attribute value is determined, for example, the second attribute value is determined by at least one of a value of the clicked attribute, a value of the browsed attribute, and a value of the display feedback attribute, so as to improve the accuracy of determining the display style.

Exemplarily, the attribute values corresponding to one or more pieces of the second attribute information may be added to obtain the second attribute value. Alternatively, in the case that the second attribute value is determined according to multiple pieces of the second attribute information, different weights are allocated to the multiple pieces of the second attribute information, for example, the clicked attribute corresponds to a weight 6, the browsed attribute corresponds to a weight 7, and the display feedback attribute corresponds to a weight 8. Then, the attribute values of the multiple pieces of the second attribute information are multiplied by the corresponding weights and then accumulated to obtain the second attribute value. For example, the second attribute value=the value of the clicked attribute×the weight 6+the value of the browsed attribute×the weight 7+the value of the display feedback attribute×the weight 8, etc., which is not limited in the present disclosure. The accuracy of determining the display style is further improved by the weight allocation.

The value of the clicked attribute=the click-through rate/the average click-through rate, and the click-through rate represents the ratio of the number of times the historical displayed second content is clicked to the number of times the historical displayed second content is displayed. The higher the click-through rate is, the higher the user's acceptance and interest in the historical displayed second content are.

The value of the browsed attribute=the browsing duration/the average browsing duration, and the browsing duration represents the time length of browsing the historical displayed second content by the user. The longer the browsing duration is, the higher the user's acceptance and interest in the historical displayed second content are.

The value of the conversion attribute=the conversion rate/the average conversion rate, and the conversion rate refers to the proportion of actions actually taken by the user after browsing the historical displayed second content, for example, the operation of purchasing the product is performed for the second content introducing the product, etc., which is not limited in the present disclosure. The higher the conversion rate is, the higher the user's acceptance and interest in the historical displayed second content are.

The value of the exited attribute=1−the exit rate/the average exit rate, and the exit rate represents the proportion of the user immediately exiting the display interface after the historical displayed second content is displayed. The lower the exit rate is, the higher the value of the exited attribute is, which represents that the user's acceptance and interest in the historical displayed second content are higher.

The value of the display feedback attribute=the user feedback score/the number of feedbacks, and the total user feedback score may be determined by means of questionnaire surveys, user comments, etc. For example, if there are five questions in the questionnaire survey, the value of the display feedback attribute=the user feedback score/5. The higher the user feedback score is, the higher the user's acceptance and interest in the historical displayed second content are.

In addition, the weight allocation of the first attribute information and the second attribute information may be set according to the importance of each attribute, which is not limited in the present disclosure.

It should be noted that, the first attribute value and the second attribute value may be determined by a client, and then the target attribute value is determined, and finally the display style of the second content is determined. Alternatively, the first attribute value and the second attribute value or the target attribute value may be determined and reported by the client to a server, and the display style of the second content is determined by the server. Alternatively, after the client reports the first attribute information and the second attribute information to the server, the server determines the first attribute value and the second attribute value, and then determines the target attribute value, and finally determines the display style of the second content, etc., which is not limited in the present disclosure.

In a possible implementation, determining the target display style of the second content associated with the first content according to the numerical relationship between the target attribute value and the preset threshold may include: using a first display style as the target display style of the second content when the target attribute value is greater than or equal to the preset threshold, where the first display style represents a display style of displaying the second content when displaying the first content is interrupted; or, using a second display style as the target display style of the second content when the target attribute value is less than the preset threshold, where the second display style represents a display style of displaying the second content while displaying the first content.

Exemplarily, the target attribute value may be obtained by adding the first attribute value and the second attribute value, and the higher the target attribute value is, the higher the user's acceptance and interest in the historical displayed second content are. When the target attribute value is higher than the preset threshold, the second content may be displayed when displaying the first content is interrupted. When the target attribute value is lower than the preset threshold, the second content may be displayed when displaying the first content is not interrupted. Therefore, the second content of different display styles may be displayed to different users. In particular, for the users with low acceptance and interest, the second content may be displayed without affecting the user's browsing of the first content, so as to improve the user's browsing experience.

Figures 2, 3:
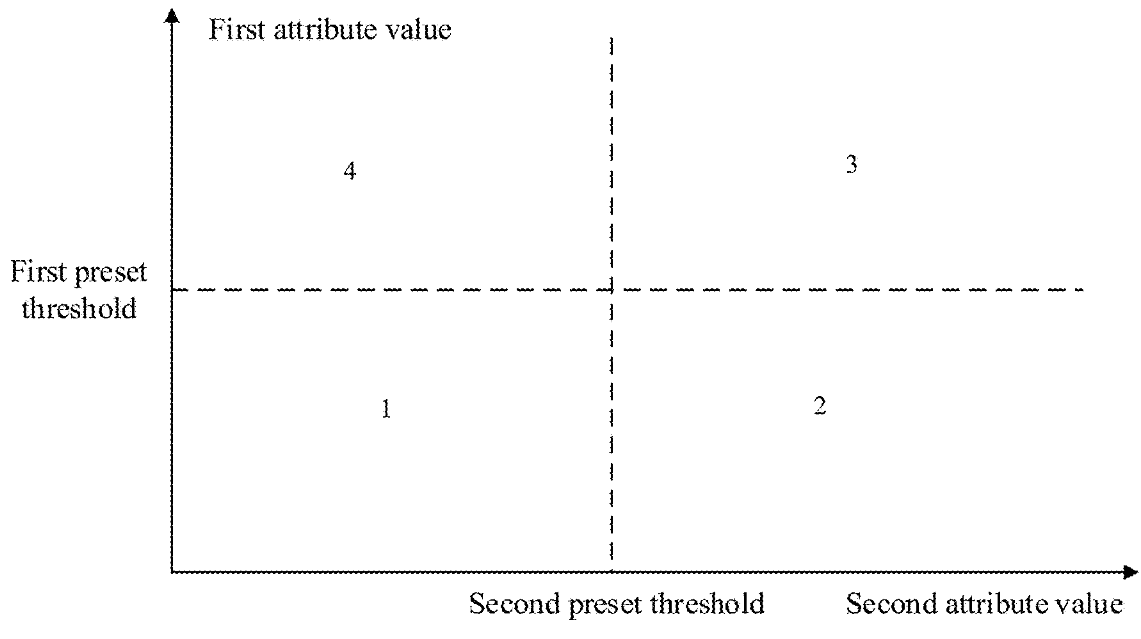
FIG. 2 is a schematic diagram of an attribute value region according to an exemplary embodiment of the present disclosure.
FIG. 3 is a schematic diagram of a first display style according to an exemplary embodiment of the present disclosure.

Exemplarily, the target attribute value may be composed of the first attribute value and the second attribute value. Referring to FIG. 2, when the first attribute value and the second attribute value both fall within the range of region 1, the display style of the second content is determined to be the second display style; when the first attribute value and the second attribute value fall within other regions, the display style of the second content is determined to be the first display style, or may be further refined to set a corresponding display style for each region. In addition, the first attribute value and the second attribute value may be determined by a single attribute value, or may be determined by multiple attribute values, which is not limited in the present disclosure.

In a possible implementation, the first display style and the second display style include at least one of the following differences: a minimum display duration corresponding to the first display style is greater than a minimum display duration corresponding to the second display style; a number of content corresponding to the first display style is greater than a number of content corresponding to the second display style; content information corresponding to the first display style is more than content information corresponding to the second display style; and a size of a display region corresponding to the first display style is greater than a size of a display region corresponding to the second display style.

Figure 4:
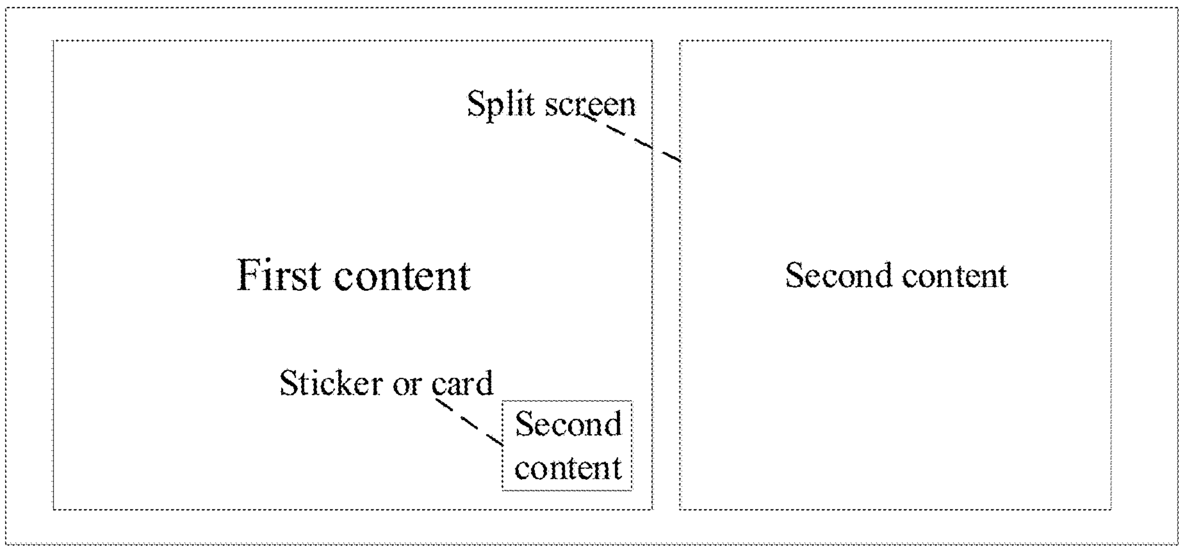
FIG. 4 is a schematic diagram of a second display style according to an exemplary embodiment of the present disclosure.

Exemplarily, the second content may be content such as a picture and text, a video, etc., taking a video introducing a product as an example, which may include information such as product details, etc., which is not limited in the present disclosure, and the content information that can be displayed in the first display style is more than the content information that can be displayed in the second display style. As shown in FIG. 3, the first display style may display the second content over the first content by means of buttons, masks or full-screen coverage, etc. As shown in FIG. 4, the second display style may display cards or stickers in a partial area of an upper layer of the first content, or display the second content in a split-screen form while displaying the first content. That is, the size of the display region corresponding to the first display style is greater than the size of the display region corresponding to the second display style. In addition, the first display style may also include some complex dynamic effects to prompt the user to click the second content for interaction, etc., which is not limited in the present disclosure.

Exemplarily, the minimum display duration corresponding to the first display style is greater than the minimum display duration corresponding to the second display style, for example, the first display style represents that a closing control is displayed after the second content is displayed for 4 seconds, and the second display style represents that a closing control is displayed after the second content is displayed for 2 seconds. The number of content corresponding to the first display style is greater than the number of content corresponding to the second display style, for example, for the same first content, the first display style corresponds to displaying three pieces of the second content, and the second display style corresponds to displaying one piece of the second content, or the first display style corresponds to continuously displaying three pieces of the second content, and the second display style corresponds to separately displaying three pieces of the second content, etc., which is not limited in the present disclosure.

It should be noted that, the first display style and the second display style may be finely divided to improve the accuracy of determining the display style, for example, the minimum display duration corresponding to the first display style is proportional to the target attribute value, and the size of the display region of the second display style is proportional to the target attribute value, etc., which is not limited in the present disclosure.

Exemplarily, a correspondence between the attribute value and the display style may also be set, for example, an attribute value of 1-10 points corresponds to a display style 1, an attribute value of 10-20 points corresponds to a display style 2, an attribute value of 20-30 points corresponds to a display style 3, etc., and then the display style is determined according to an attribute value interval corresponding to the target attribute value. Generally, the higher the target attribute value is, the longer the display duration of the second content represented by the display style is, the more the content number and the content information are, the larger the display region is, and the more the product discounts are, etc., which may be specifically set according to requirements, and which is not limited in the present disclosure.

In a possible implementation, determining the target display style of second content associated with the first content may include: determining a browsing state of the first content, and determining a target attribute value according to the attribute information of the historical displayed second content; and determining the target display style of the second content according to the browsing state and the target attribute value.

Exemplarily, the target display style of the second content may also be determined based on the browsing state of the first content and the target attribute value. Taking the first content as the video content as an example, after determining that a display style is adopted according to the target attribute value, the style adjustment may be performed according to different browsing states. For example, the second content may be displayed in a first area of an upper layer of the video when the video starts playing, and the second content may be displayed in a second area of an upper layer of the video when the video is played to the middle, and the second area is larger than the first area. Alternatively, the second content is displayed for a first duration when the video starts playing, and the second content is displayed for a second duration when the video is played to the middle, and the second duration is greater than the first duration, etc., which is not limited in the present disclosure.

In addition, the client may adjust the target display style of the second content based on the browsing state of the first content, or the client may upload the browsing state of the first content to the server, and then the server determines and sends the display style of the second content, etc., which is not limited in the present disclosure.

By adopting the above method, the second content of different display styles may be displayed to different users, for example, unobvious second content is displayed to the users with low interest and acceptance, and obvious second content is displayed to the users with high interest and acceptance. Therefore, the exit rate of displaying the second content is reduced and the probability of completely displaying the second content is increased without changing the total display duration of the second content, and the display styles of the second content are enriched, and the user's browsing experience is also improved.

Figure 5:
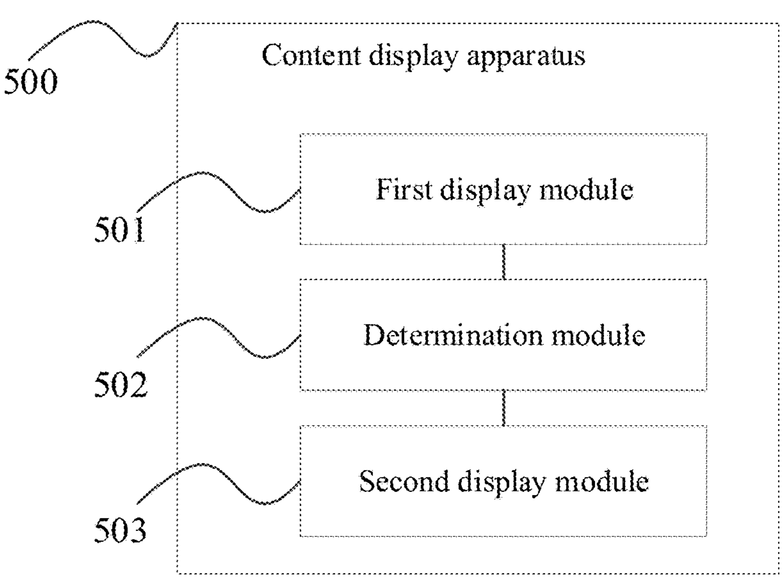
FIG. 5 is a block diagram of a content display apparatus according to an exemplary embodiment of the present disclosure.

Based on the same inventive concept, the present disclosure further provides a content display apparatus. Referring to FIG. 5, the content display apparatus 500 includes:

- a first display module, configured to display a content display interface, where the content display interface displays first content;
- a determination module, configured to determine a target display style of second content associated with the first content, where the target display style of the second content is determined at least based on attribute information of historical displayed second content; and
- a second display module, configured to display the second content according to the target display style.

By adopting the above apparatus, the content display interface displays the first content, the target display style of the second content associated with the first content is determined at least based on the attribute information of the historical displayed second content, and then the second content is displayed according to the determined target display style. By adopting this method, the display style of the second content is determined based on the attribute information of the historical displayed second content, and the second content of different display styles can be displayed, thereby enriching the display styles of the second content, and further improving the user's browsing experience.

Optionally, the target display style of the second content is determined by:

- a first determination sub-module, configured to determine a target attribute value according to the attribute information of the historical displayed second content; and
- a second determination sub-module, configured to determine the target display style of the second content associated with the first content according to a numerical relationship between the target attribute value and a preset threshold.

Optionally, the first determination sub-module is configured to:

- determine a first attribute value according to first attribute information of the historical displayed second content;
- determine a second attribute value according to second attribute information of the historical displayed second content, where information included in the first attribute information is more than information included in the second attribute information; and
- determine the target attribute value according to the first attribute value and the second attribute value.

Optionally, the first determination sub-module is configured to:

- determine the first attribute value according to at least one of a clicked attribute, a browsed attribute, a conversion attribute, an exited attribute, and a display feedback attribute of the historical displayed second content.

Optionally, the first determination sub-module is configured to:

- determine the second attribute value according to at least one of a clicked attribute, a browsed attribute, and a display feedback attribute of the historical displayed second content.

Optionally, the second determination sub-module is configured to:

- using a first display style as the target display style of the second content when the target attribute value is greater than or equal to the preset threshold, where the first display style represents a display style of displaying the second content when displaying the first content is interrupted; or,
- using a second display style as the target display style of the second content when the target attribute value is less than the preset threshold, where the second display style represents a display style of displaying the second content while displaying the first content.

Optionally, the first display style and the second display style include at least one of the following differences:

- a minimum display duration corresponding to the first display style is greater than a minimum display duration corresponding to the second display style;
- a number of content corresponding to the first display style is greater than a number of content corresponding to the second display style;

content information corresponding to the first display style is more than content information corresponding to the second display style; and a size of a display region corresponding to the first display style is greater than a size of a display region corresponding to the second display style.

Optionally, the target display style of the second content is determined by:

a third determination sub-module, configured to determine a browsing state of the first content, and determine a target attribute value according to the attribute information of the historical displayed second content; and a fourth determination sub-module, configured to determine the target display style of the second content according to the browsing state and the target attribute value.

Regarding the apparatus in the above embodiments, the specific manner in which each module performs an operation has been described in detail in the method embodiments, which will not be elaborated here.

Based on the same concept, the embodiments of the present disclosure further provide a computer-readable medium, on which a computer program is stored, and when the program is executed by a processing apparatus, the steps of the above content display method are implemented.

Based on the same concept, the embodiments of the present disclosure further provide an electronic device, including:

a storage apparatus, on which a computer program is stored; and a processing apparatus, to execute the computer program in the storage apparatus to implement the steps of the above content display method.

Figure 6:
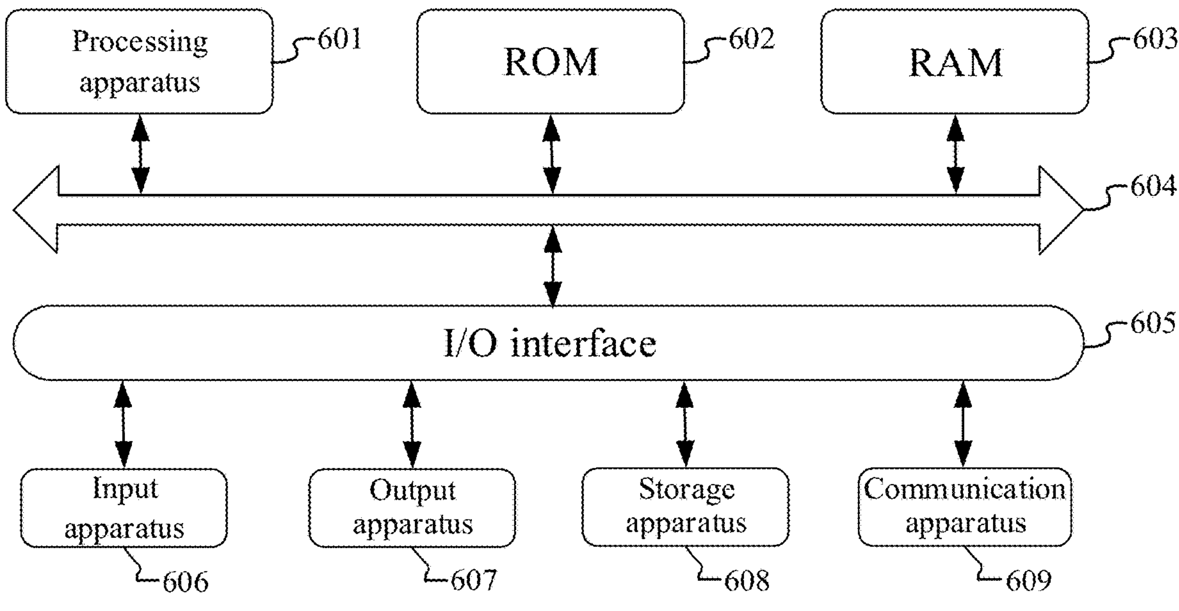
FIG. 6 is a block diagram of an electronic device according to an exemplary embodiment of the present disclosure.

Reference is made to FIG. 6 below, which illustrates a schematic structural diagram of an electronic device 600 suitable for implementing the embodiments of the present disclosure. The electronic device in this embodiment of the present disclosure may include, but is not limited to, mobile terminals such as mobile phones, notebook computers, digital broadcast receivers, PDAs (Personal Digital Assistants), PADs (tablet computers), PMPs (portable multimedia players), vehicle-mounted terminals (for example, vehicle-mounted navigation terminals), and fixed terminals such as digital TVs, desktop computers, etc. The electronic device shown in FIG. 6 is only an example, and should not bring any limitation to the functions and scope of use of the embodiments of the present disclosure.

As shown in FIG. 6, the electronic device 600 may include a processing apparatus (e.g., a central processing unit, a graphics processing unit, etc.) 601, which can perform various appropriate actions and processes according to a program stored in a read-only memory (ROM) 602 or a program loaded from a storage apparatus 608 into a random-access memory (RAM) 603. The RAM 603 further stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touchscreen, a touchpad, a keyboard, a mouse, a camera, a microphone, an accelerometer, a gyroscope, etc.; an output apparatus 607 including, for example, a liquid crystal display (LCD), a speaker, a vibrator, etc.; a storage apparatus 608 including, for example, a magnetic tape, a hard disk, etc.; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the illustrated apparatuses. More or fewer apparatuses may alternatively be implemented or provided.

In particular, according to the embodiments of the present disclosure, the processes described above with reference to the flowchart can be implemented as a computer software program. For example, an embodiment of the present disclosure includes a computer program product, which includes a computer program carried on a non-transitory computer-readable medium, and the computer program contains program codes for executing the method shown in the flowchart. In such an embodiment, the computer program may be downloaded and installed from a network through the communication apparatus 609, or installed from the storage apparatus 608, or installed from the ROM 602. When the computer program is executed by the processing apparatus 601, the above functions defined in the method of the embodiment of the present disclosure are executed.

It should be noted that the above computer-readable medium in the present disclosure may be a computer-readable signal medium or a computer-readable storage medium, or any combination of both the above. The computer-readable storage medium may be, for example, but not limited to, an electrical, magnetic, optical, electromagnetic, infrared, or semiconductor system, apparatus, or device, or any combination of the above. More specific examples of the computer-readable storage medium may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium containing or storing a program, and the program may be used by or in combination with an instruction execution system, apparatus, or device. In the present disclosure, however, the computer-readable signal medium may include a data signal propagated in a baseband or as a part of a carrier wave, and computer-readable program codes are carried therein. The propagated data signal may take a variety of forms, including but not limited to an electromagnetic signal, an optical signal, or any suitable combination of the above. The computer-readable signal medium may also be any computer-readable medium other than the computer-readable storage medium. The computer-readable signal medium may send, propagate, or transmit a program used by or in combination with an instruction execution system, apparatus, or device. The program codes contained on the computer-readable medium may be transmitted by any suitable medium, including but not limited to: a wire, an optical cable, RF (radio frequency), etc., or any suitable combination of the above.

In some implementations, clients and servers may communicate using any currently known or future developed network protocol, such as HTTP (Hypertext Transfer Protocol), and may be interconnected with digital data communication (for example, a communication network) in any form or medium. Examples of the communication network include a local area network ("LAN"), a wide area network ("WAN"), an internet (for example, the Internet), and a peer-to-peer network (for example, an ad hoc peer-to-peer network), as well as any currently known or future developed network.

The above computer-readable medium may be included in the above electronic device; or may exist alone without being assembled into the electronic device.

The above computer-readable medium carries one or more programs, and when the one or more programs are executed by the electronic device, the electronic device is caused to: display a content display interface, where the content display interface displays first content; determine a target display style of second content associated with the first content, where the target display style of the second content is determined at least based on attribute information of historical displayed second content; and display the second content according to the target display style.

The computer program code used to perform the operations of the present disclosure may be written in one or more programming languages or a combination thereof, including but not limited to an object-oriented programming language such as Java, Smalltalk, C++, and also including a conventional procedural programming language such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, a program segment, or a portion of code, which includes one or more executable instructions for implementing the specified logical function. It should also be noted that, in some alternative implementations, the functions noted in the blocks may occur out of the order noted in the drawings. For example, two blocks shown in succession may, in fact, be executed substantially concurrently, or the blocks may sometimes be executed in the reverse order, depending upon the functionality involved. It should also be noted that, each block of the block diagrams and/or flowcharts, and combinations of blocks in the block diagrams and/or flowcharts, may be implemented by special purpose hardware-based systems that perform the specified functions or operations, or may also be implemented by a combination of special purpose hardware and computer instructions.

The modules involved in the embodiments of the present disclosure may be implemented in software or hardware. The name of a module does not constitute a limitation on the module itself under certain circumstances.

The functions described herein above may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD) and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

The above description is only a preferred embodiment of the present disclosure and an explanation of the applied technical principles. Those skilled in the art should understand that the disclosure scope involved in this disclosure is not limited to the technical solutions formed by the specific combination of the above technical features, and should also cover other technical solutions formed by any combination of the above technical features or their equivalent features without departing from the above disclosure concept. For example, a technical solution formed by replacing the above features with technical features having similar functions disclosed in this disclosure (but not limited to).

In addition, although the various operations are described in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be interpreted as limiting the scope of the present disclosure. Certain features that are described in the context of separate embodiments can also be implemented in combination in a single embodiment. Conversely, various features described in the context of a single embodiment may also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are only exemplary forms for implementing the claims. Regarding the apparatus in the above embodiments, the specific manner in which each module performs an operation has been described in detail in the method embodiments, which will not be elaborated here.

The invention claimed is:

1. A content display method, comprising:

displaying a content display interface, wherein the content display interface displays first content;

determining a target display style of second content associated with the first content, wherein the target display style of the second content is determined at least based on attribute information of historical displayed second content; and displaying the second content according to the target display style, wherein the target display style of the second content is determined by:

determining a target attribute value according to the attribute information of the historical displayed second content; and determining the target display style of the second content associated with the first content according to a numerical relationship between the target attribute value and a preset threshold, the determining a target attribute value according to the attribute information of the historical displayed second content comprises:

determining a first attribute value according to first attribute information of the historical displayed second content;

determining a second attribute value according to second attribute information of the historical displayed second content, wherein information comprised in the first attribute information is more than information comprised in the second attribute information; and determining the target attribute value according to the first attribute value and the second attribute value.

2. The content display method according to claim 1, wherein the determining a first attribute value according to first attribute information of the historical displayed second content comprises:

determining the first attribute value according to at least one of a clicked attribute, a browsed attribute, a conversion attribute, an exited attribute, and a display feedback attribute of the historical displayed second content.

3. The content display method according to claim 2, wherein the determining the target display style of the second content associated with the first content according to the numerical relationship between the target attribute value and the preset threshold comprises:

using a first display style as the target display style of the second content when the target attribute value is greater than or equal to the preset threshold, wherein the first display style represents a display style of displaying the second content when displaying the first content is interrupted; or, using a second display style as the target display style of the second content when the target attribute value is less than the preset threshold, wherein the second display style represents a display style of displaying the second content while displaying the first content.

4. The content display method according to claim 1, wherein the determining a second attribute value according to second attribute information of the historical displayed second content comprises:

determining the second attribute value according to at least one of a clicked attribute, a browsed attribute, and a display feedback attribute of the historical displayed second content.

5. The content display method according to claim 4, wherein the determining the target display style of the second content associated with the first content according to the numerical relationship between the target attribute value and the preset threshold comprises:

using a first display style as the target display style of the second content when the target attribute value is greater than or equal to the preset threshold, wherein the first display style represents a display style of displaying the second content when displaying the first content is interrupted; or, using a second display style as the target display style of the second content when the target attribute value is less than the preset threshold, wherein the second display style represents a display style of displaying the second content while displaying the first content.

6. The content display method according to claim 1, wherein the determining the target display style of the second content associated with the first content according to the numerical relationship between the target attribute value and the preset threshold comprises:

using a first display style as the target display style of the second content when the target attribute value is greater than or equal to the preset threshold, wherein the first display style represents a display style of displaying the second content when displaying the first content is interrupted; or, using a second display style as the target display style of the second content when the target attribute value is less than the preset threshold, wherein the second display style represents a display style of displaying the second content while displaying the first content.

7. The content display method according to claim 6, wherein the first display style and the second display style comprise at least one of the following differences:

a minimum display duration corresponding to the first display style is greater than a minimum display duration corresponding to the second display style;

a number of content corresponding to the first display style is greater than a number of content corresponding to the second display style;

content information corresponding to the first display style is more than content information corresponding to the second display style; and a size of a display region corresponding to the first display style is greater than a size of a display region corresponding to the second display style.

8. The content display method according to claim 1, wherein the determining the target display style of the second content associated with the first content according to the numerical relationship between the target attribute value and the preset threshold comprises:

using a first display style as the target display style of the second content when the target attribute value is greater than or equal to the preset threshold, wherein the first display style represents a display style of displaying the second content when displaying the first content is interrupted; or, using a second display style as the target display style of the second content when the target attribute value is less than the preset threshold, wherein the second display style represents a display style of displaying the second content while displaying the first content.

9. An electronic device, comprising:

at least one storage apparatus, storing at least one computer program thereon;

at least one processing apparatus, configured to execute the at least one computer program in the at least one storage apparatus, to implement a content display method, which comprises:

displaying a content display interface, wherein the content display interface displays first content;

determining a target display style of second content associated with the first content, wherein the target display style of the second content is determined at least based on attribute information of historical displayed second content; and displaying the second content according to the target display, wherein the target display style of the second content is determined by:

determining a target attribute value according to the attribute information of the historical displayed second content; and determining the target display style of the second content associated with the first content according to a numerical relationship between the target attribute value and a preset threshold, the determining a target attribute value according to the attribute information of the historical displayed second content comprises:

determining a first attribute value according to first attribute information of the historical displayed second content;

determining a second attribute value according to second attribute information of the historical displayed second content, wherein information comprised in the first attribute information is more than information comprised in the second attribute information; and determining the target attribute value according to the first attribute value and the second attribute value.

10. The electronic device according to claim 9, wherein the determining the target display style of the second content associated with the first content according to the numerical relationship between the target attribute value and the preset threshold comprises:

using a first display style as the target display style of the second content when the target attribute value is greater than or equal to the preset threshold, wherein the first display style represents a display style of displaying the second content when displaying the first content is interrupted; or, using a second display style as the target display style of the second content when the target attribute value is less than the preset threshold, wherein the second display style represents a display style of displaying the second content while displaying the first content.

11. The electronic device according to claim 10, wherein the first display style and the second display style comprise at least one of the following differences:

a minimum display duration corresponding to the first display style is greater than a minimum display duration corresponding to the second display style;

a number of content corresponding to the first display style is greater than a number of content corresponding to the second display style;

content information corresponding to the first display style is more than content information corresponding to the second display style; and a size of a display region corresponding to the first display style is greater than a size of a display region corresponding to the second display style.

12. The electronic device according to claim 9, wherein the determining a first attribute value according to first attribute information of the historical displayed second content comprises:

determining the first attribute value according to at least one of a clicked attribute, a browsed attribute, a conversion attribute, an exited attribute, and a display feedback attribute of the historical displayed second content.

13. The electronic device according to claim 9, wherein the determining a second attribute value according to second attribute information of the historical displayed second content comprises:

determining the second attribute value according to at least one of a clicked attribute, a browsed attribute, and a display feedback attribute of the historical displayed second content.

14. A non-transient computer-readable storage medium, storing a computer program thereon, wherein when the program is executed by a processing apparatus, a content display method is implemented and the content display method comprises:

displaying a content display interface, wherein the content display interface displays first content;

determining a target display style of second content associated with the first content, wherein the target display style of the second content is determined at least based on attribute information of historical displayed second content; and displaying the second content according to the target display style, wherein the target display style of the second content is determined by:

determining a target attribute value according to the attribute information of the historical displayed second content; and determining the target display style of the second content associated with the first content according to a numerical relationship between the target attribute value and a preset threshold, the determining a target attribute value according to the attribute information of the historical displayed second content comprises:

determining a first attribute value according to first attribute information of the historical displayed second content;

determining a second attribute value according to second attribute information of the historical displayed second content, wherein information comprised in the first attribute information is more than information comprised in the second attribute information; and determining the target attribute value according to the first attribute value and the second attribute value.

* * * * *